United States Patent Office 3,755,366
Patented Aug. 28, 1973

3,755,366
PIPERONYL CARBAMATE HERBICIDES
Ryuzo Nishiyama, Kyoto, and Ryohei Takahashi, Takahiro Haga, and Tadaaki Toki, Kusatsu, Japan, assignors to Ishihara Sangyo Kaisha Ltd., Osaka, Japan
No Drawing. Filed Feb. 22, 1971, Ser. No. 117,699
Claims priority, application Japan, Feb. 23, 1970, 45/14,833
Int. Cl. C07d 13/10
U.S. Cl. 260—340.5       11 Claims

ABSTRACT OF THE DISCLOSURE

Herbicides, having the general formula:

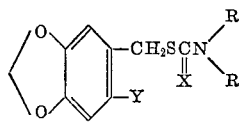

wherein X represents oxygen or sulfur; Y represents hydrogen or halogen and R represents a lower alkyl group, have been prepared and have been found to possess remarkable selective growth controlling properties.

BACKGROUND OF THE INVENTION

Field of the invention

This invention relates to novel piperonyl carbamate type herbicides which are useful for agricultural purposes.

Description of the prior art

In general, conventional organic herbicides can be classified in one of the groups of (1) aliphatic compounds, (2) aromatic compounds, (3) urea compounds, (4) carbamate compounds and heterocyclic compounds. Many types of carbamate compounds have been prepared and examined by the present inventors, and as a result of these studies, it has been found that very slight differences in chemical structure or in particular substituents, numbers of substituents or position of substituents, will often result in unexpected and unpredictable differences in herbicidal properties. These differences and variations can have a significant effect on the degree, manner and durability of the herbicidal properties and the possibility of chemical injury to the desired plants. Accordingly, it is quite rare to succeed to find an effective herbicidal compound.

SUMMARY OF THE INVENTION

Accordingly, it is one object of this invention to provide a novel piperonyl carbamate type herbicide having excellent weed growth controlling properties.

It is another object of this invention to provide a novel herbicide having excellent growth controlling selectivity towards specific various harmful weeds.

It is a further object of this invention to provide a novel herbicide for effectively controlling the growth of harmful weeds, particularly barnyard grass in a paddy field.

These and other objects have now herein been attained by the discovery that the following novel piperonyl carbamate type compounds possess excellent weed growth controlling properties and remarkable selectivity towards specific plants. The novel piperonyl carbamate compounds used in this invention possess the following general formula:

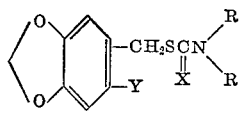

(1)

wherein X represents oxygen or sulfur; Y represents hydrogen or halogen; and R represents a lower alkyl group.

DETAILED DESCRIPTION OF PREFERRED EMBODIMENTS

In accordance with this invention, it has now been found that the novel carbamate compounds having the general Formula 1 possess remarkable and unexpected herbicidal properties.

The following compounds are typical examples of carbamates of this invention:

| Compound No. | Chemical name | Physical property |
|---|---|---|
| 1 | Piperonyl N,N-diethyl thiol carbamate. | B.P. 186–188° C./1.2 mm. Hg. |
| 2 | Piperonyl N,N-di-n-propyl thiol carbamate. | B.P. 194–198° C./1.5 mm. Hg. |
| 3 | Piperonyl N,N-diethyl dithio carbamate. | B.P. 214–218° C./1.7 mm. Hg. |
| 4 | Piperonyl N,N-di-n-propyl dithio carbamate. | B.P. 220–224° C./1.7 mm. Hg. |
| 5 | Piperonyl N,N-di-isopropyl dithio carbamate. | B.P. 216–220° C./1.7 mm. Hg. |
| 6 | 6-chloro piperonyl N,N-dimethyl thiol carbamate. | M.P. 110–113° C. |
| 7 | 6-chloro piperonyl N,N-diethyl thiol carbamate. | B.P. 173–175° C./0.3 mm. Hg. |
| 8 | 6-chloro piperonyl N,N-di-n-propyl thiol carbamate. | B.P. 184–188° C./0.8 mm. Hg. |
| 9 | 6-chloro piperonyl N,N-dimethyl dithio carbamate. | M.P. 95–97° C. |
| 10 | 6-chloro piperonyl N,N-di-n-propyl dithio carbamate. | B.P. 192–193° C./0.3 mm. Hg. |
| 11 | 6-chloro piperonyl N,N-di-isopropyl dithio carbamate. | B.P. 209–214° C./0.5 mm. Hg. |
| 12 | 6-bromo piperonyl N,N-dimethyl thiol carbamate. | M.P. 112–114° C. |
| 13 | 6-bromo piperonyl N,N-diethyl thiol carbamate. | M.P. 106–109° C. |
| 14 | 6-bromo piperonyl N,N-diethyl dithio carbamate. | M.P. 72–75° C. |
| 15 | 6-bromo piperonyl N,N-di-isopropyl dithio carbamate. | B.P. 189–193° C./1 mm. Hg. |

The herbicides of this invention have been found to have the following advantageous characteristics, as will be shown in the following experiments:

(1) They exhibit remarkably good herbicidal properties against weeds in paddy fields, such as barnyardgrass.

(2) They exhibit remarkably good selective growth control properties against such weeds as barnyardgrass, large crabgrass, common chickweed, redroot, pigweed and wild oats, without injuring the products in up-land fields.

(3) They possess good herbicidal properties against such common weeds as monochoria (*Monochoria vaginalis* PRESL), (*Rotala indica* KOEHNE), False pimpernel (*Lindernia procumbêns* PHILCOX), Long stemmed waterwort (*Elatine triandra* SCHK), water foxtail (*Alopercurus aequalis* SOBOL var. *amurensis* OHWI), and Bog stitchwort (*Steliaria alsine* GRIMM var. *undulata* OHWI), etc.

Accordingly, the herbicides of this invention can be effectively applied in a wide variety of environments such as paddy fields, up-lands, orchards, turves, woodlands, roadsides, banks, railroads, playgrounds, lakeside, water supply brook, etc.

EXPERIMENT 1

Pots of 1/100 m.² were filled with soil and were supersaturated with water. A specific amount of air-dried barnyardgrass (*Echinochloa crusgalli* BEAUV) seeds were sown in the pots and covered with soil.

When the barnyardgrass appeared on the ground, water was poured into each pot to a depth of 4 cm. and then a specific concentration of aqueous dispersion of each active ingredient was poured into the pot.

Fourteen days after said treatment, each survival grass was taken up, air dried and weighed.

The results are shown in percentage by weight of grass survival of treated seed versus untreated seed and is indicated as "Degree of Growth."

TABLE I

| Compound No. | Amount of active ingredient (g./acre) | | |
|---|---|---|---|
| | 1,600 | 800 | 400 |
| | Degree of growth | | |
| 1 | 0 | 0 | 0 |
| 2 | 0 | 0 | 0 |
| 3 | 6 | 18 | 26 |
| 4 | 6.3 | 5.9 | 31.5 |
| 5 | 0 | 0 | 0 |
| 6 | 8 | 15 | 34 |
| 7 | 25 | 22 | 37 |
| 8 | 31 | 25 | 35 |
| 9 | 29 | 49 | 85 |
| 10 | 26 | 32 | 60 |
| 11 | 22 | 11 | 23 |
| 12 | 18 | 54 | 47 |
| 13 | 26 | 22 | 37 |
| 14 | 37 | 31 | 47 |
| 15 | 9 | 5 | 14 |
| Non-treatment | 100 | 100 | 100 |

EXPERIMENT 2

Pots of 1/30 m.$^2$ were filled with soil containing seeds of barnyardgrass (*Echinochloa crusgalli* BEAUV), large crabgrass (*Digitaria adscendens* HENR), common chickweed (*Stellaria neglecta* WEIHE), redroot pigweed (*Amaranthus retroflexus* L), wild oat (*Avena fatua* L) and maintained in up-land condition.

The rice seeds and pea seeds were sown in the pots and were covered with soil to a depth of about 1 cm. Three days after sowing, the specific amount of an aqueous dispersion of each ingredient was sprayed onto the soil. After 18 days after spraying, the growth condition of each of rice, pea and general up-land weeds was observed. The results are shown in Table II.

In the Table II, the degree of growth control is stated using the following standards:

5: Complete growth control is found.
4: Remarkable growth control is found.
3: Clear growth control is found.
2: Necrosis of leaves is found but disappeared later.
1: Same condition as untreated seeds.

TABLE II

| | Degree of suppression | |
|---|---|---|
| | Compound No. 1 | Non-treatment |
| Rice | 1-2 | 1 |
| Pea | 1 | 1 |
| Barnyard | 5 | 1 |
| Large crab-grass | 5 | 1 |
| Common chickweed | 5 | 1 |
| Redroot pigweed | 5 | 1 |
| Wild oat | 5 | 1 |

The quantity of herbicide required depends upon the weather, soil, form of preparation, season, method of application and type of weeds. Usually, 400–8,000 g. per acre and preferably 800–4,000 g. per acre is effective. The herbicidal compounds of this invention can be applied in the form of an aqueous dispersion, a dust, a granule, a wettable powder, a water miscible solution or an emulsion with auxiliary agents such as diluent, solvent, emulsifier and spreader. The herbicidal compounds of this invention may be used together with other herbicidal compounds, insecticides, fungicides, fertilizers or soils. Sometimes, more effective results are obtainable when applied in combination with such other materials.

Having now generally described the invention, a better understanding can be obtained by reference to certain specific examples which are provided herein for purposes of illustration only, and are not intended to be limiting unless otherwise specified.

EXAMPLE 1

Into a 4-necked flask equipped with a stirrer, funnel, reflux condenser and thermometer, an ethanol solution containing 1 mole of trimethylamine salt of N,N-dimethyl thiol carbamate was introduced, and 17 g. of piperonyl chloride was added dropwise. The flask was cooled with water during the exothermic reaction so as to maintain the temperature at about 50° C. After the exothermic reaction, the flask was maintained at 50° C. for 4 hours in a water bath.

After the reaction, the content of the flask was poured into a suitable amount of water and then was extracted with ether. The extract phase was washed with water, and was dehydrated with anhydrous sodium sulfate. From the resulting solution, ether was removed and the oily remaining product was distilled to yield 20 g. of piperonyl N,N-diethyl thiol carbamate of oily red-brown color. (Boiling point 186–188° C./12 mm. Hg.) 20 parts by weight of piperonyl N,N-diethyl diol carbamate, 65 parts by weight of xylene and 15 parts by weight of polyoxyethylene lauryl ether were mixed to obtain a herbicide preparation in an emulsion form. The preparation was diluted with 100 l. of water and 1.6 kg./acre of the herbicide preparation was applied to a paddy field, seven days after the rice transplantation.

EXAMPLE 2

40 parts by weight of piperonyl N,N-di-n-propyl thiol carbamate which was produced by a similar process as described in Example 1, 50 parts by weight of xylene, and 10 parts by weight of alkylarylpolyoxyethylene were mixed to prepare the herbicide preparation in an emulsion form. The preparation was diluted with 100 l. of water and 3.2 kg./acre of the herbicide preparation was applied to up-land field prior to germination of rice and pea plants.

EXAMPLE 3

20 parts by weight of piperonyl N,N-diethyl dithio carbamate which was produced by the process similar to that described in Example 1, 70 parts by weight of kaolin and 10 parts by weight of polyoxyethylene lauryl ether were mixed to obtain a herbicide preparation in a wettable powder form. The preparation was diluted with 100 l. of water and 4 kg./acre of the herbicide preparation was applied to up-land field prior to germination of the rice and pea plants.

EXAMPLE 4

8 parts by weight of piperonyl N,N-di-isopropyl dithio carbamate which was produced by the process similar to that described in Example 1, 82 parts by weight of bentonite, and 10 parts by weight of sodium lignin sulfonate were mixed and crushed into powder form. It was further kneaded with a small amount of water and was extruded to make granules having a diameter of 0.7–0.8 mm. 16 kg./acre of the herbicide preparation was scattered over a paddy field 7 days after transplantation of rice.

EXAMPLE 5

8 parts by weight of 6-bromo piperonyl N,N-di-isopropyl dithio carbamate which was produced by a process similar to that described in Example 1, and 5 parts by weight of polyoxyethylene lauryl ether were mixed and uniformly sprayed onto 45 parts by weight of kaolin powder. The resulting product was mixed with 37 parts by weight of bentonite, and 5 parts by weight of calcium lignin sulfonate dissolved with a small amount of water, and was extruded to make granules having a diameter of 0.7–0.8 mm. 16 kg./acre of the herbicide preparation was scattered over a paddy field 7 days after transplanta tion of rice.

Having now fully described the invention, it will be apparent to one of ordinary skill in the art that many changes and modifications can be made to the invention without departing from the spirit or scope thereof.

What is claimed as new and desired to be secured by Letters Patent of the United States is:

1. A compound having the formula:

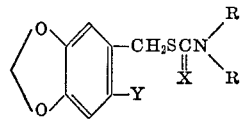

wherein X represents oxygen or sulfur; Y represents bromine or chlorine and R represents hydrogen, methyl, ethyl, propyl or i-propyl.

2. The compound of claim 1 wherein Y is hydrogen.
3. The compound of claim 1 wherein Y is chlorine.
4. The compound of claim 1 wherein Y is bromine.
5. The compound of claim 1 wherein R is ethyl group and X is oxygen atom.
6. The compound of claim 1 wherein R is n-propyl group and X is oxygen.
7. The compound of claim 1 wherein R is ethyl group and X is sulfur atom.
8. The compound of claim 1 wherein R is n-propyl group and X is sulfur.
9. The compound of claim 1 wherein R is isopropyl group and X is sulfur.
10. The compound according to claim 1 wherein X is oxygen, Y is chlorine and R is methyl group.
11. The compound of claim 1 wherein X is sulfur, Y is bromine and R is isopropyl group.

References Cited
UNITED STATES PATENTS 2,856,411  10/1958  Prill _____ 260—340.5
3,509,200  4/1970   Elpern et al. _____ 260—340.5

ALEX MAZEL, Primary Examiner

J. H. TURNIPSEED, Assistant Examiner

U.S. Cl. X.R.
424—282